United States Patent
Matsumoto

(10) Patent No.: US 11,104,187 B2
(45) Date of Patent: Aug. 31, 2021

(54) PNEUMATIC TIRE

(71) Applicant: Sumitomo Rubber Industries, Ltd., Kobe (JP)

(72) Inventor: Tadao Matsumoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 321 days.

(21) Appl. No.: 15/819,902

(22) Filed: Nov. 21, 2017

(65) Prior Publication Data

US 2018/0162178 A1  Jun. 14, 2018

(30) Foreign Application Priority Data

Dec. 12, 2016 (JP) .............................. JP2016-240507

(51) Int. Cl.
  *B60C 13/02* (2006.01)
  *B60C 13/00* (2006.01)
  *B60C 11/01* (2006.01)

(52) U.S. Cl.
  CPC .............. *B60C 13/02* (2013.01); *B60C 11/01* (2013.01); *B60C 13/002* (2013.01); *B60C 2200/14* (2013.01)

(58) Field of Classification Search
  CPC ....... B60C 13/02; B60C 13/002; B60C 11/01; B60C 2200/14; B60C 11/04
  See application file for complete search history.

(56) References Cited

U.S. PATENT DOCUMENTS

| | | | | |
|---|---|---|---|---|
| 2010/0200135 A1* | 8/2010 | Ohara | .................... | B60C 13/02 152/209.11 |
| 2010/0294412 A1* | 11/2010 | Inoue | ..................... | B60C 13/02 152/523 |
| 2011/0088826 A1* | 4/2011 | Watanabe | .............. | B60C 13/02 152/523 |
| 2012/0073719 A1* | 3/2012 | Kurosawa | ............. | B60C 13/002 152/523 |
| 2012/0216930 A1* | 8/2012 | Matsuda | ................. | B60C 11/11 152/209.18 |

(Continued)

FOREIGN PATENT DOCUMENTS

| EP | 2233322 A1 | 9/2010 |
|---|---|---|
| EP | 2287017 A1 | 2/2011 |

(Continued)

OTHER PUBLICATIONS

Extended European Search Report, dated Jan. 25, 2018, for European Application No. 17192148.9.

*Primary Examiner* — Timothy Kennedy
*Assistant Examiner* — Olukorede Esan
(74) *Attorney, Agent, or Firm* — Birch, Stewart, Kolasch & Birch, LLP

(57) ABSTRACT

A pneumatic tire 1 comprises a sidewall portion 3. The sidewall portion 3 comprises an outer surface (3a) provided with a plurality of protruding portions 9 protruding outwardly in a tire axial direction and arranged in a tire circumferential direction. Each of the protruding portions 9 comprises a pair of side surfaces 12 extending in a tire radial direction at both ends in a tire circumferential direction of each of the protruding portions 9 and a top surface 13 arranged outermost in the tire axial direction between the pair of the side surfaces 12. In at least one of the protruding portions 9, the top surface 13 is provided with at least one groove 16.

20 Claims, 7 Drawing Sheets

(56) References Cited

U.S. PATENT DOCUMENTS

2013/0075006 A1* 3/2013 Kojima .................. B60C 13/02
  152/523
2013/0139936 A1  7/2013 Ohara

FOREIGN PATENT DOCUMENTS

FR   3027256 A1  4/2016
JP   2013-119277 A  6/2013

* cited by examiner

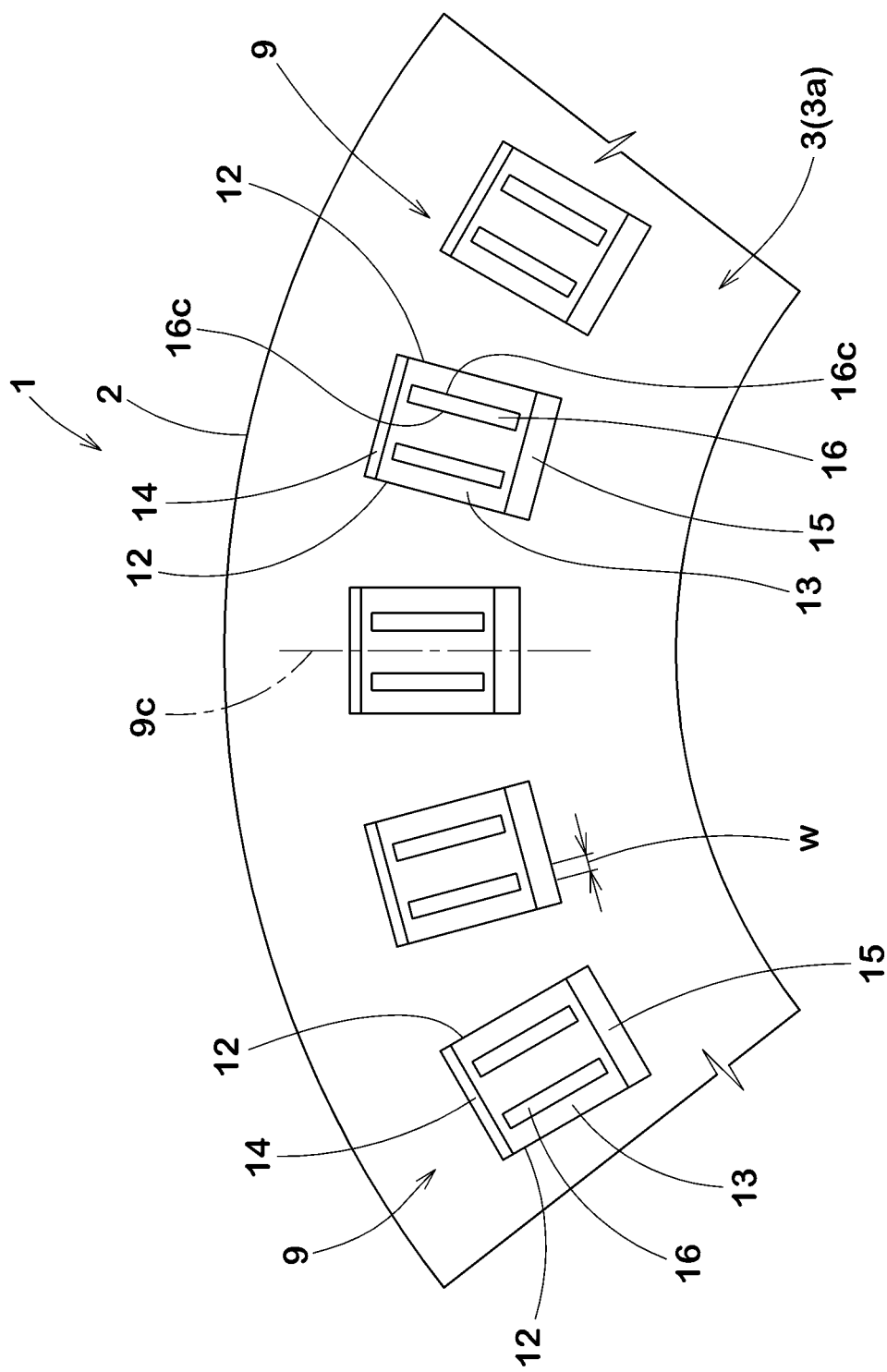

PNEUMATIC TIRE

TECHNICAL FIELD

The present invention relates to a pneumatic tire having improved mud performance and ride comfort in a good balance.

BACKGROUND ART

For example, a pneumatic tire to be mounted on a 4WD-car or the like may have a chance to run on a soft muddy road surface where the tire sinks greatly in addition to a hard road surface such as asphalt road surface. Such a pneumatic tire is required to exert sufficient traction performance on a muddy road surface (hereinafter, such performance may be referred to as "mud performance"). As a pneumatic tire of this type, it is known to provide a protruding portion protruding outwardly in a tire axial direction on an outer surface of a sidewall portion to exert traction performance on a muddy road surface.

Unfortunately, in such a pneumatic tire, the protruding portion provided on the outer surface of the sidewall portion excessively increases rigidity of the sidewall portion, therefore, it is possible that the ride comfort tends to deteriorate.

SUMMARY OF THE INVENTION

The present invention was made in view of the above, and a primary object thereof is to provide a pneumatic tire having improved mud performance and ride comfort in a good balance.

In one aspect of the present invention, a pneumatic tire comprises a sidewall portion comprising an outer surface provided with a plurality of protruding portions protruding outwardly in a tire axial direction and arranged in a tire circumferential direction, each of the protruding portions comprising a pair of side surfaces extending in a tire radial direction at both ends in a tire circumferential direction of each of the protruding portions and a top surface arranged outermost in the tire axial direction between the pair of the side surfaces, and in at least one of the protruding portions, the top surface being provided with at least one groove.

In another aspect of the invention, it is preferred that the at least one groove extends along the tire circumferential direction.

In another aspect of the invention, it is preferred that the at least one groove is connected with at least one of the pair of side surfaces.

In another aspect of the invention, it is preferred that the at least one groove connects between the pair of side surfaces.

In another aspect of the invention, it is preferred that said at least one of the protruding portions is provided with a plurality of the grooves arranged in the tire radial direction.

In another aspect of the invention, it is preferred that a depth of the at least one groove is in a range of from 40% to 70% of a protruding height of the at least one of the protruding portions.

In another aspect of the invention, it is preferred that a width of the at least one groove is in a range of from 10% to 25% of a length in the tire radial direction of the at least one of the protruding portions.

In another aspect of the invention, it is preferred that the at least one groove comprises a groove bottom including at least one arc-shaped portion convex inwardly in the tire axial direction in a cross section.

In another aspect of the invention, it is preferred that in at least one of the protruding portions, the top surface is provided with at least two grooves, and an arrangement pitch of the at least two grooves in the tire radial direction is in a range of from 150% to 350% of widths of the at least two grooves.

BRIEF DESCRIPTION OF THE DRAWINGS

FIG. 7 is a side view of the sidewall portion of yet another embodiment.

DESCRIPTION OF THE PREFERRED EMBODIMENTS

An embodiment of the present invention will now be described in conjunction with accompanying drawings.

Figure 1:
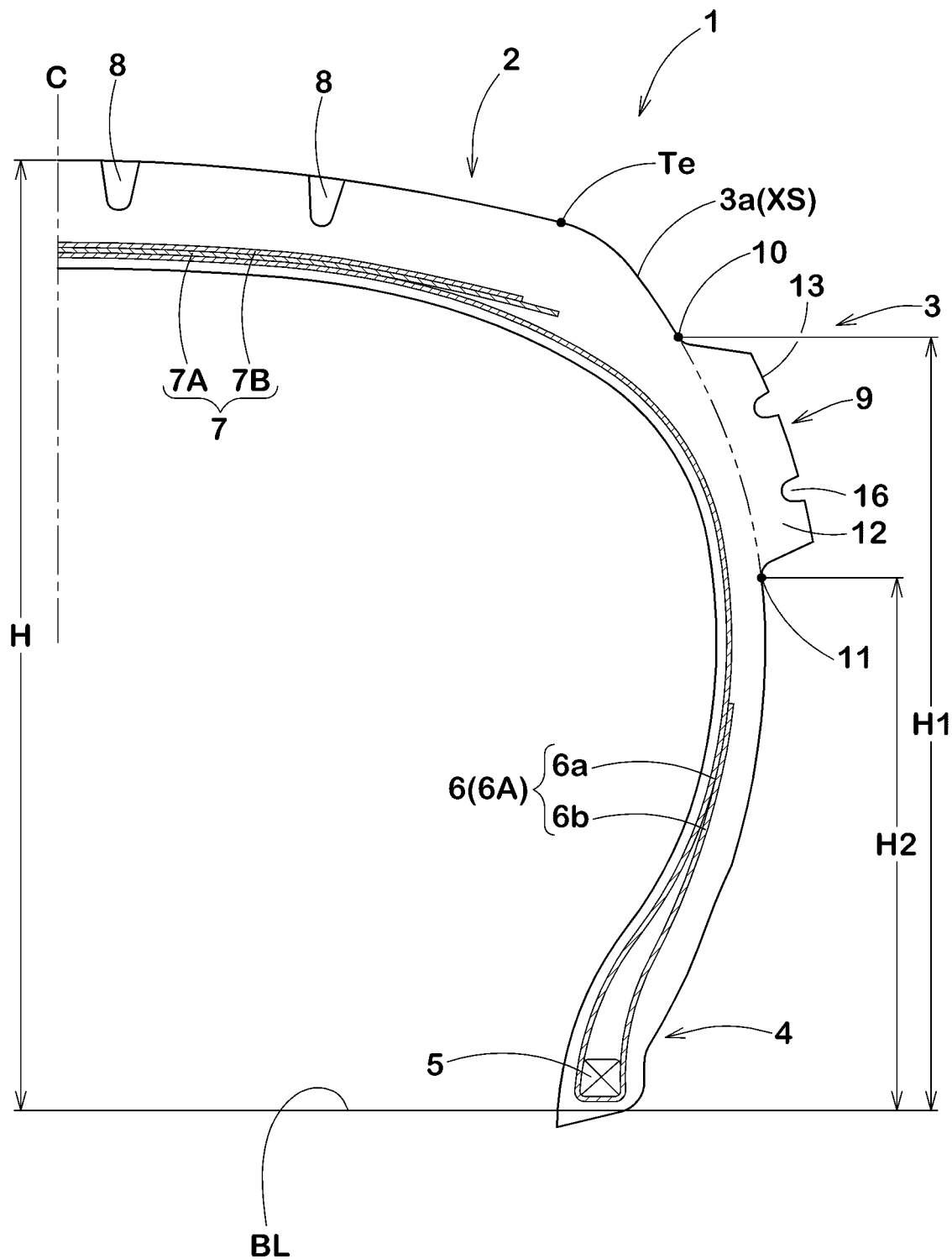
FIG. 1 is a meridian cross-section of a pneumatic tire as an embodiment of the present invention.

FIG. 1 is a meridian cross-section of a pneumatic tire (hereinafter, may be simply referred to as "tire") 1 as an embodiment of the present invention in a standard state. In this specification, the "standard state" is a state in which the tire is mounted on a standard rim (not shown), inflated to a standard pressure, and loaded with no tire load. Sizes and the like of various parts of the tire are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. Further, the "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The pneumatic tire 1 in this embodiment comprises a carcass 6 extending between a pair of bead cores 5 of bead portions 4 via a tread portion 2 and sidewall portions 3, and a belt layer 7 disposed on an outer side in a tire radial direction of the carcass 6 and inside the tread portion 2. Note that the tread portion 2 is suitably provided with at least one groove 8 for draining or discharging mud.

The carcass 6 comprises at least one, one in this embodiment, carcass ply 6A. The carcass ply 6A includes a main body portion (6a) which extends in a toroidal manner between the pair of the bead cores 5, and a turned up portions (6b) extending from both sides of the main body portion (6a) and each turned up around the bead core 5 from an inside to an outside in a tire axial direction. The carcass ply 6A includes carcass cords arranged at an angle in a range of from 75 to 90 degrees, for example, with respect to a tire equator (C). As the carcass cords, organic fiber cords or steel cords are used, for example.

The belt layer 7 comprises at least two belt plies, belt plies 7A and 7B respectively disposed on an inner side and the outer side in the tire radial direction in this embodiment. Each of the belt plies 7A and 7B includes highly elastic belt cords such as steel cords arranged at an angle in a range of from 15 to 40 degrees with respect to the tire equator (c). The belt plies 7A and 7B are arranged so as to intersect each other, for example.

Figure 2:
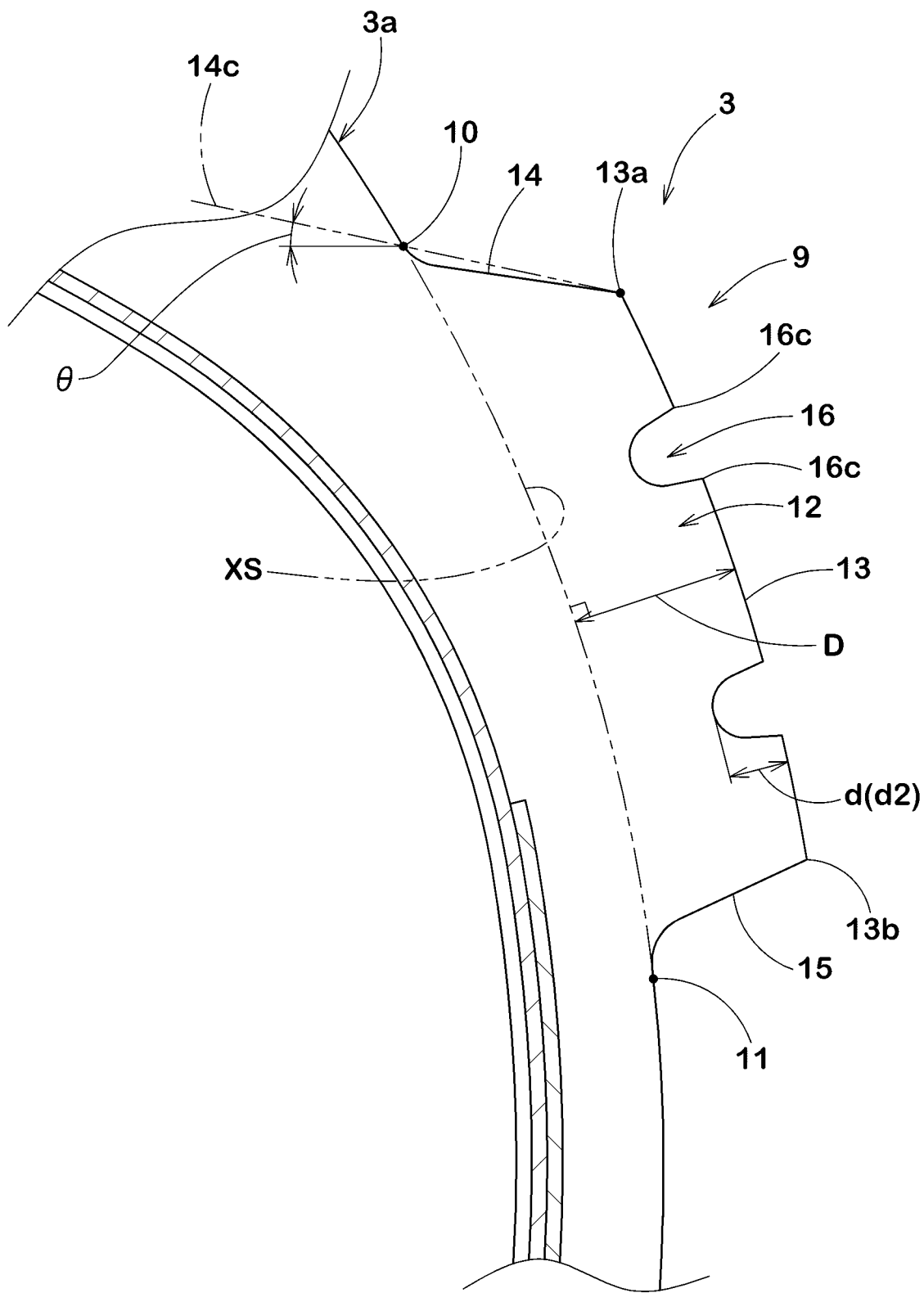
FIG. 2 is an enlarged view of a protruding portion of FIG. 1.
Figure 3:
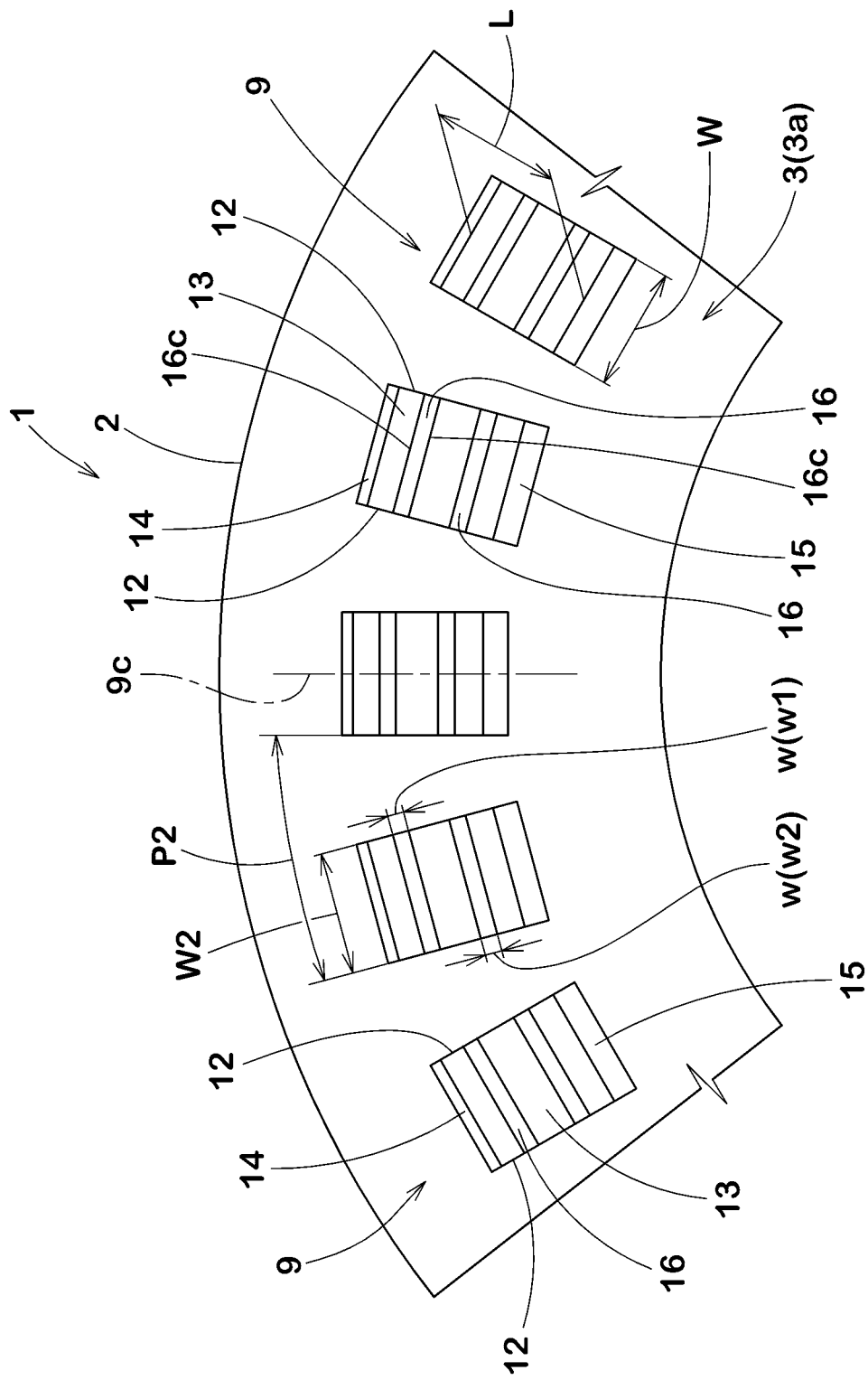
FIG. 3 is a side view of the sidewall portion of FIG. 1.

As shown in FIGS. 2 and 3, an outer surface (3a) of the sidewall portion 3 is provided with a plurality of protruding portions 9 protruding outwardly in the tire axial direction. The protruding portions 9 configured as such exert traction due to shearing force against a soft muddy road surface where the tire 1 sinks, therefore, the mud performance is improved.

The outer surface (3a) of the sidewall portion 3 means a reference curved surface (XS) of the sidewall portion 3 extending radially inwardly and smoothly from one of tread edges (Te) in the standard state, Local irregularities including relief of marks and the like and concave/convex patterns are excluded.

The "tread edges (Te)" are defined as axially outermost ground contacting positions when the tire 1 in the standard state is in contact with a flat surface with zero camber angle by being loaded with a standard load. The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Note that when the tire is for a passenger car, the standard load is a load equivalent to 88% of the above listed loads.

The protruding portions 9 in this embodiment are provided on the sidewall portions 3 on both sides in the tire axial direction of the tire 1. Note that the protruding portions 9 may be provided on at least one of the sidewall portions 3.

Each of the protruding portions 9 includes a pair of side surfaces 12 extending in the tire radial direction at both ends thereof in a tire circumferential direction and a top surface 13 disposed axially outermost between the pair of the side surfaces 12. Each of the protruding portions 9 in this embodiment further includes an outer side surface 14 connected with an edge (13a) of the top surface 13 on the outer side in the tire radial direction and an inner side surface 15 connected with an edge (13b) of the top surface 13 on the inner side in the tire radial direction so as to be formed in a substantially rectangular parallelepiped shape.

The top surface 13 of the protruding portion 9 is provided with grooves 16. The grooves 16 configured as such effectively decrease rigidity of the sidewall portion 3, therefore, ride comfort is improved. Further, the grooves 16 extend between the pair of the side surfaces 12 of the protruding portion 9, therefore, rigidity difference of the protruding portion 9 is maintained small over the tire circumferential direction. Thereby, occurrence of cracks or the like starting from ends of the grooves 16 is suppressed, therefore, resistance to cracks is maintained high.

The grooves 16 extend along the tire circumferential direction. Thereby, the rigidity difference in the tire radial direction of the protruding portion 9 is further decreased over the tire circumferential direction, therefore, the occurrence of the cracks is further suppressed. "Extend along the tire circumferential direction" means not only that groove edges (16c) of the groove 16 overlap arcs centered on a tire rotation axis (not shown), but also that the groove edges (16c) intersect orthogonally with a tire radial direction line (9c) passing through an intermediate position in the tire circumferential direction of the protruding portion 9.

At least one of the protruding portions 9 is provided with at least one groove 16, a plurality of the grooves 16 in this embodiment arranged in the tire radial direction, specifically, two grooves 16 in this embodiment arranged adjacently to each other in the tire radial direction.

Figure 4A:
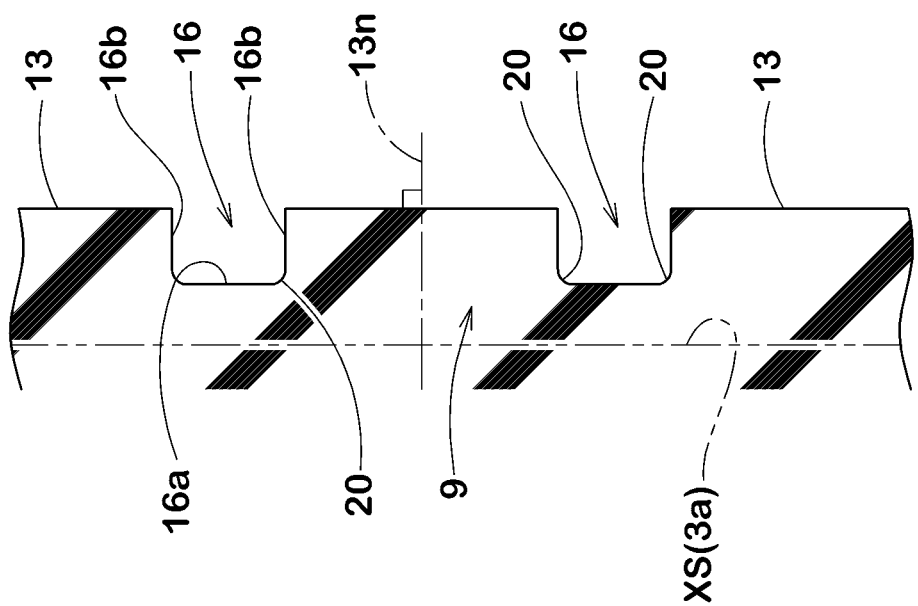
FIG. 4A is a transverse cross sectional view of grooves of FIG. 1.

As shown in FIG. 4A, in a cross section of the groove 16, the groove 16 includes a groove bottom (16a) including a maximum depth position at which a depth thereof is the maximum and a pair of groove side surfaces (16b) connecting between the groove bottom (16a) and the top surface 13.

The groove bottom (16a) of the groove 16 is provided with at least one, one in this embodiment, arc-shaped portion 20 convex axially inwardly. The arc-shaped portion 20 configured as such further suppresses the cracks occurring in the groove bottom (16a). Although not particularly limited, it is preferred that a radius of curvature (R) of the arc-shaped portion 20 is not less than 1 mm and not greater than 3 mm.

Figure 4B:
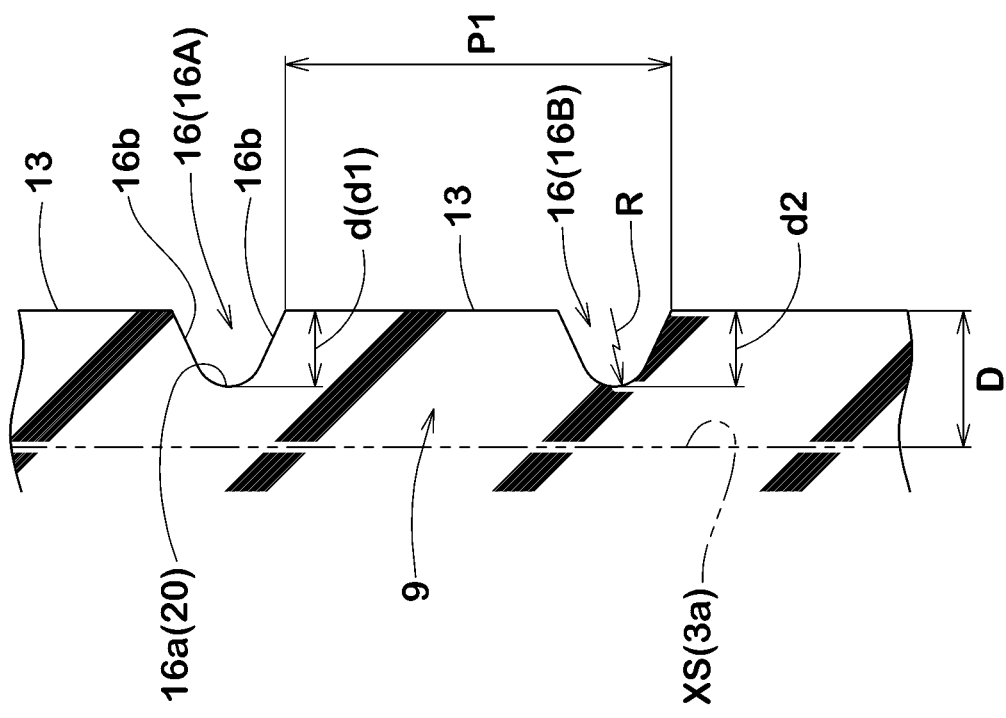
FIG. 4B is a transverse cross sectional view of the grooves of another embodiment.

A cross sectional profile of the groove 16 in this embodiment includes one arc-shaped portion 20 and a pair of the groove side surfaces (16b) extending obliquely with respect to a normal line (13n) of the top surface 13 so as to form a substantially triangular shape. Note that the cross sectional profile of the groove 16 is not limited to such an embodiment. As shown in FIG. 4B, for example, the cross sectional profile of the groove 16 may comprise two arc-shaped portions 20 disposed at both ends in the tire radial direction of the groove bottom (16a) and a pair of the groove side surfaces (16b) extending in a direction of the normal line (13n) so as to form a substantially rectangular shape. The grooves 16 configured as such can further suppress the occurrence of the cracks as compared with those having the substantially triangular cross sectional profiles.

It is preferred that depths (d) of the grooves 16 are in a range of from 40% to 70% of protruding heights (D) of the protruding portions 9. If the depths (d) of the grooves 16 are less than 40% of the protruding heights (D) of the protruding portions 9, the rigidity of the sidewall portion 3 cannot be moderated, therefore, it is possible that the ride comfort is deteriorated. If the depths (d) of the grooves 16 are greater than 70% of the protruding heights (D) of the protruding portions 9, the rigidity of the protruding portions 9 is excessively decreased, therefore, it is possible that the cracks are likely to occur in the groove bottoms (16a) of the grooves 16. The protruding height (D) of the protruding portion 9 is defined as a distance between the top surface 13 of the protruding portion 9 and the reference curved surface (XS) in a direction of the normal line thereof.

In this embodiment, the grooves 16 arranged in the tire radial direction of one protruding portion 9 have the same depths (d). Note that a depth (d1) of a groove 16A on the outer side in the tire radial direction may be smaller than a depth (d2) of a groove 16B on the inner side in the tire radial direction. As compared with the groove 16B on the inner side in the tire radial direction, the groove 16A on the outer side in the tire radial direction is closer to a road surface, therefore, it is more likely to come into contact with a sharp stone and the like. Thereby, by setting the depth (d1) of the groove 16A disposed on the outer side in the tire radial direction and the depth (d2) of the groove 16B disposed on the inner side in the tire radial direction as described above, cut resistant performance and the ride comfort are improved. In order to effectively exert such an effect, it is preferred that, in the grooves 16 provided in the same protruding portion 9, the depth (d1) of the groove 16A on the outer side in the tire radial direction is in a range of from 70% to 90% of the depth (d2) of the groove 16B on the inner side in the tire radial direction.

It is preferred that a width (w) of the groove 16 is in a range of from 10% to 25% of a length (L) (shown in FIG. 3) in the tire radial direction of the protruding portion 9. If the width (w) of the groove 16 is less than 10% of the length (L) of the protruding portion 9, the rigidity of the sidewall portion 3 cannot be moderated, therefore, it is possible that the ride comfort is deteriorated. If the width (w) of the groove 16 is greater than 25% of the length (L) of the protruding portion 9, the rigidity of the protruding portion 9 is excessively decreased, therefore, it is possible that the cracks are likely to occur in the groove bottom (16a) of the groove 16. From this viewpoint, it is further preferred that the width (w) of the groove 16 is in a range of from 15% to 20% of the length (L) in the tire radial direction of the protruding portion 9. In this specification, the length (L) in the tire radial direction of the protruding portion 9 is a length in the tire radial direction measured along the tire radial direction line (9c) of the protruding portion 9.

The widths (w) of the grooves 16A and 16B provided in a same protruding portion 9 is the same in this embodiment. Note that a width (w1) of the groove 16A disposed on the outer side in the tire radial direction may be smaller than a width (w2) of the groove 16B disposed on the inner side in the tire radial direction. As compared with the groove 16 disposed on the inner side in the tire radial direction, the groove 16 disposed on the outer side in the tire radial direction is closer to a road surface, therefore, it is more likely to come into contact with a sharp stone and the like. Thereby, by setting the widths (w) of the grooves 16, i.e. the width (w1) of the groove 16A and the width (w2) of the groove 16B, as described above, the cut resistant performance and the ride comfort are improved. In order to effectively exert such an effect, in the grooves 16 adjacent in the tire radial direction, it is preferred that the width (w1) of the groove 16A on the radially outer side is in a range of from 70% to 90% of the width (w2) of the groove 16B on the radially inner side.

It is preferred that an arrangement pitch P1 of the grooves 16 in the tire radial direction is in a range of from 150% to 350% of the widths (w) of the grooves 16. If the arrangement pitch P1 of the grooves 16 in the tire radial direction is less than 150% of the widths (w) of the grooves 16, the rigidity of the protruding portion 9 is excessively decreased, therefore, it is possible that the cracks are likely to occur in the groove bottoms (16a) of the grooves. If the arrangement pitch P1 of the grooves 16 in the tire radial direction is greater than 350% of the widths (w) of the grooves 16, the rigidity of the sidewall portion 3 cannot be moderated, therefore, it is possible that the ride comfort is deteriorated.

As shown in FIG. 1, the protruding portion 9 includes an outer end 10 in the tire radial direction and an inner end 11 in the tire radial direction. The outer end 10 is formed at a boundary between the outer side surface 14 and the reference curved surface (XS). The inner end 11 is formed at a boundary between the inner side surface 15 and the reference curved surface (XS).

It is preferred that a height H1 of the outer end 10 of the protruding portion 9 in the tire radial direction from a bead base line BL is in a range of from 0.75 to 0.9 times a tire section height (H). If the height H1 of the outer end 10 of the protruding portion 9 from the bead base line BL is greater than 0.9 times the tire section height (H), the outer end 10 of the protruding portion 9 is likely to come in contact with a road surface of other than a rough road such as a muddy road, therefore, it is possible that deterioration of the ride comfort and early wear of the protruding portion 9 occur. If the height H1 is less than 0.75 times the tire section height (H), it is possible that it becomes difficult for the protruding portions 9 to contact with an inside of mud of a muddy road, and in addition, that an area where cut damage is likely to occur cannot be protected.

Similarly, it is preferred that a height H2 of the inner end 11 of the protruding portion 9 in the tire radial direction from the bead base line BL is in a range of from 0.5 to 0.7 times the tire section height (H). If the height H2 of the inner end 11 of the protruding portion 9 from the bead base line BL is greater than 0.7 times the tire section height (H), the traction on a muddy road is decreased, therefore, it is possible that the mud performance is not sufficiently maintained. If the height H2 is less than 0.5 times the tire section height (H), it is possible that tire mass is unnecessarily increased.

As shown in FIG. 2, it is preferred that the protruding heights (D) of the protruding portions 9 are in a range of from 3 to 10 mm. If the protruding heights (D) are less than 3 mm, it is possible that sufficient shearing force against mud is not obtained. If the protruding heights (D) are greater than 10 mm, it is possible that the tire mass is unnecessarily increased.

It is preferred that an angle θ of the outer side surface 14 with respect to the tire axial direction is in a range of from 5 to 30 degrees. If the angle θ of the outer side surface 14 is less than 5 degrees, mud and the like sandwiched between the protruding portions 9 is difficult to be discharged, therefore, it is possible that the mud performance is deteriorated. If the angle θ of the outer side surface 14 is greater than 30 degrees, it is possible that the shearing force against mud and the like is decreased. The angle θ of the outer side surface 14 is an angle of an imaginary line (14c) connecting the outer end 10 and the edge (13a) on the outer side in the tire radial direction of the top surface 13, and the angle is defined as positive when the outer end 10 is located on the outer side in the tire radial direction of the edge (13a).

As shown in FIG. 3, it is preferred that an arrangement pitch P2 in the tire circumferential direction of adjacent two of the protruding portions 9 is in a range of from about 1.5 to about 3.0 times a length W in the tire circumferential direction of the protruding portion 9. Thereby, the mud performance and the ride comfort are improved in a good balance. From the similar viewpoint, it is preferred that the length W in the tire circumferential direction of the protruding portion 9 is in a range of from about 30 to about 60 mm. The arrangement pitch P2 of the protruding portions 9 and the lengths (w) of the protruding portions 9 are values measured at the outer ends 10 of the protruding portions 9.

Figure 5:
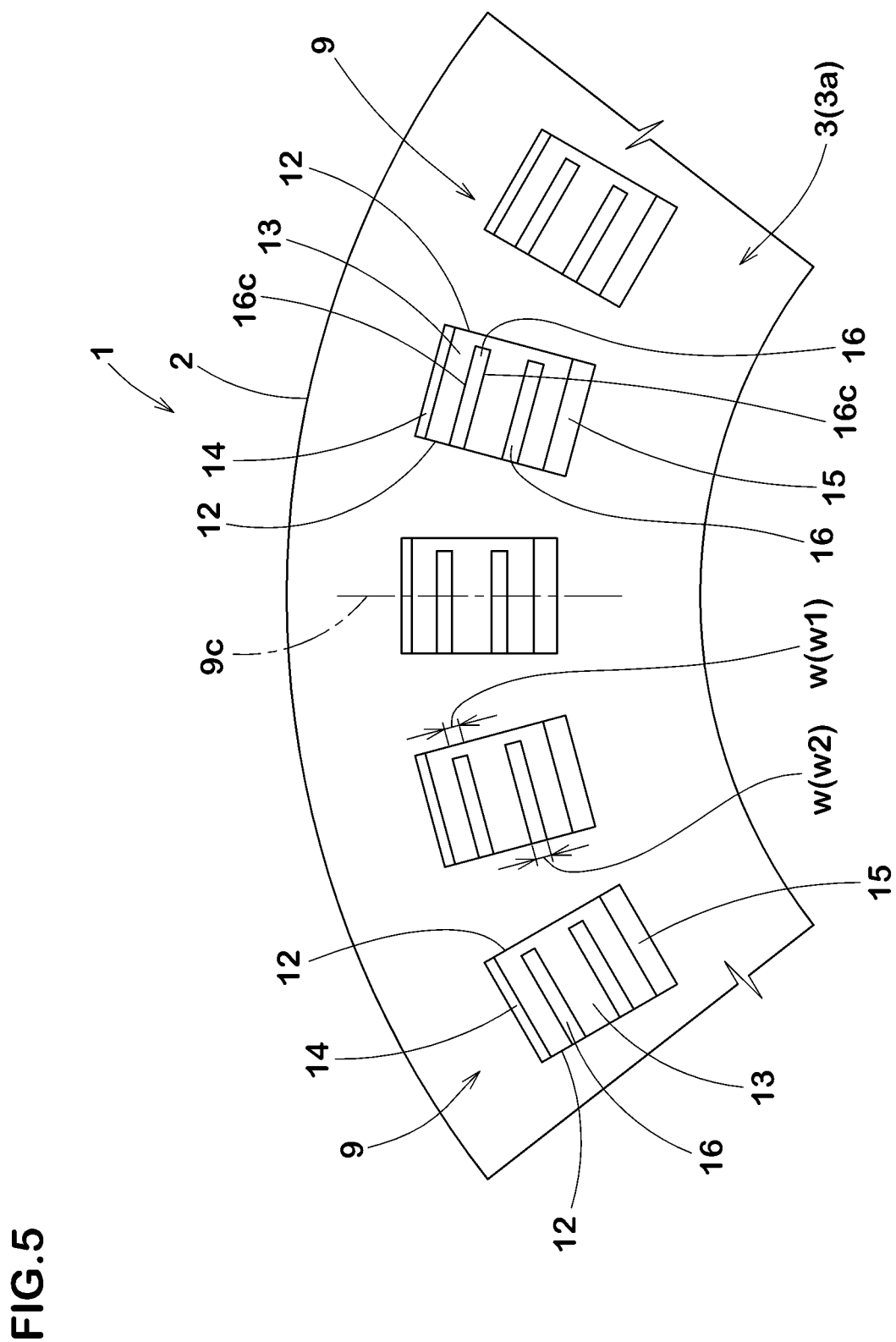
FIG. 5 is a side view of the sidewall portion of another embodiment.

FIG. 5 is a side view of the sidewall portion 3 according to another embodiment. Note that description of configurations of the grooves 16 in this another embodiment same as those of the grooves 16 of the above-described embodiments shown in FIGS. 1 to 4B is omitted and only configurations different from those of the grooves 16 of the above-described embodiments will be described. As shown in FIG. 5, the groove 16 in this another embodiment is connected with one of the side surfaces 12 (the one on the left side in FIG. 5), extends toward the other one of the side surfaces 12 (the one on the right side in FIG. 5), and terminates within the top surface 13. The groove 16 configured as such can effectively improve the ride comfort and resistance to cracks as it is connected with one of the side surfaces 12.

Figure 6:
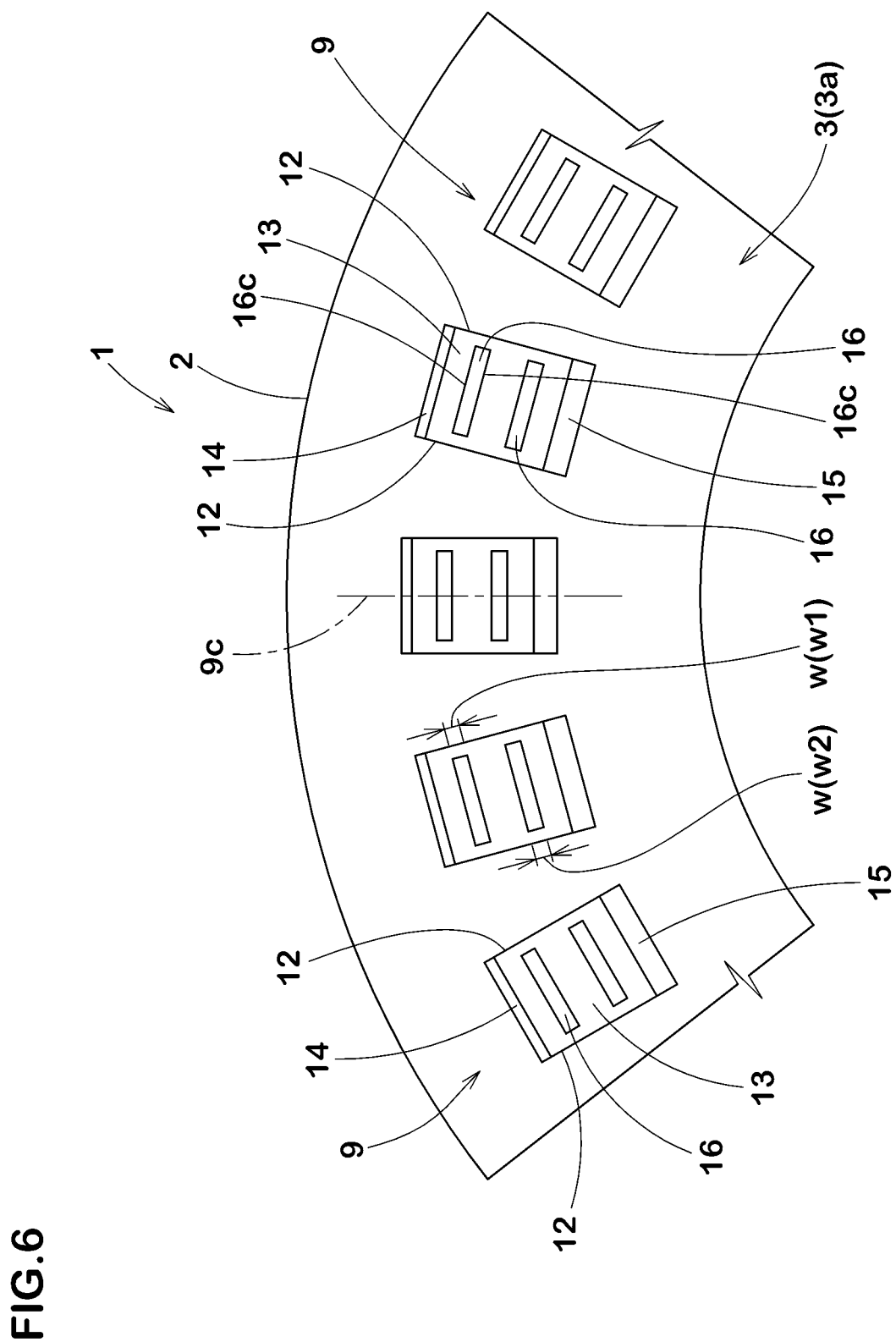
FIG. 6 is a side view of the sidewall portion of yet another embodiment.

FIG. 6 is a side view of the sidewall portion 3 according to yet another embodiment. As shown in FIG. 6, the groove 16 in this yet another embodiment extends in the tire circumferential direction and terminates at both ends thereof within the top surface 13. The groove 16 configured as such has both ends terminating within the top surface 13, therefore, excessive deformation of the groove 16 is suppressed, high traction is exerted, and the mud performance is improved.

FIG. 7 is a side view of a sidewall portion 3 according to still another embodiment. As shown in FIG. 7, the groove 16 in this still another embodiment extends in the tire radial direction and both ends thereof terminate within the top surface 13. The groove 16 configured as such suppresses increase of the tire mass by decreasing the volume of the protruding portion 9, therefore, it suppresses deterioration of the ride comfort. Further, decrease of the rigidity in the tire radial direction is suppressed, therefore, high traction is exerted and the mud performance is improved.

While detailed description has been made of the pneumatic tire as embodiments of the present invention, the present invention can be embodied in various forms without being limited to the illustrated embodiments.

Working Example (Example)

Tires of size 265/70R17 having the basic structure shown in FIG. 1 and the protruding portions configured according to the specifications listed in Table 1 were manufactured, then they were tested for their performance. Note that the common specifications are as follows.

The height H1 of the outer end of the protruding portion/ the tire section height (H): 77%

The height H2 of the inner end of the protruding portion/ the tire section height (H): 60%

The length W in the tire circumferential direction of the protruding portion: 50 mm Number of the protruding portion: 20

A length W2 in the tire circumferential direction of the protruding portion is shown in FIG. 3.

The cross section of the protruding portion: FIG. 4A

References are the tires having protruding portions without the grooves.

The length of the groove of Example 14 is shown as a ratio to the length (L) of the protruding portion.

Test methods are as follows.

<Mud Performance>

Each of the test tires were mounted on all wheels of a 4WD-car with displacement of 2000 cc under the following condition. Then a test driver drove the test car on a soft muddy road surface of a test course and evaluated running characteristics related to the traction performance and brake performance by the driver's feeling while driving. The results are indicated by an evaluation point based on Reference 1 being 100, wherein a larger numerical value is better.

Tire pressure (all wheels): 210 kPa

<Ride Comfort>

The test driver drove the test car on a dry asphalt road surface of a test course and evaluated the ride comfort by the driver's feeling while driving. The results are indicated by an evaluation point based on Example 1 being 100 wherein a larger numerical value is better.

<Resistance to Cracks>

Each of the test tires was run on a drum testing machine having a diameter of 1.7 m at a speed of 50 km/h for 200,000 km and being loaded with the standard load. Then the presence or absence of damage such as cracks and chips in the grooves and the others was visually confirmed. Evaluation was made by scoring as follows.

1 point: Number of the cracks occurred is less than 10% of the total number of the grooves.

2 points: Number of the cracks occurred is not less than 10% and not greater than 20% of the total number of the grooves.

3 points: Number of the cracks occurred is not less than 20% and not greater than 30% of the total number of the grooves.

4 points: Number of the cracks occurred is not less than 30%.

The test results are shown in Table 1.

TABLE 1

|  |  | Ref. | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Figure showing shapes of protruding portions |  | — | FIG. 3 | FIG. 3 | FIG. 3 | FIG. 3 | FIG. 3 | FIG. 3 | FIG. 3 | FIG. 3 | FIG. 3 | FIG. 3 | FIG. 3 | FIG. 5 | FIG. 6 | FIG. 7 |
| Ratio of lengths W2 of grooves and lengths (W) | [%] | — | 100 | 100 | 100 | 100 | 100 | 100 | 100 | 100 | 100 | 100 | 100 | 95 | 90 | 90 |
| Ratio of depths (d) of grooves and protruding heights (D) | [%] | — | 0.5 | 0.35 | 0.4 | 0.7 | 0.8 | 0.5 | 0.5 | 0.5 | 0.5 | 0.5 | 0.5 | 0.5 | 0.5 | 0.5 |
| Ratio of widths (w) of grooves and lengths (L) | [%] | — | 0.2 | 0.2 | 0.2 | 0.2 | 0.2 | 0.05 | 0.1 | 0.25 | 0.3 | 0.2 | 0.2 | 0.2 | 0.2 | 0.2 |
| Radius of curvature (R) | [mm] | — | 2.0 | 2.0 | 2.0 | 2.0 | 2.0 | 2.0 | 2.0 | 2.0 | 2.0 | 0.5 | 1.0 | 2.0 | 2.0 | 2.0 |
| Mud performance [evaluation point: larger value is better] |  | 100 | 95 | 97 | 96 | 94 | 92 | 97 | 96 | 94 | 92 | 98 | 95 | 95 | 97 | 100 |
| Ride comfort [evaluation point: larger value is better] |  | 80 | 100 | 96 | 98 | 100 | 102 | 96 | 98 | 100 | 102 | 98 | 100 | 96 | 94 | 94 |
| Resistance to cracks [evaluation point: smaller value is better] |  | 1 | 1 | 1 | 1 | 1 | 2 | 1 | 1 | 1 | 2 | 2 | 1 | 2 | 3 | 2 |

From the test results, as compared with the tire as the Reference, it can be confirmed that the performance of the tires as the Examples was improved effectively. In the tire as the Example 1, the ride comfort was greatly improved while the mud performance and the resistance to cracks were maintained high. Further, tires of a different size from the above were also tested, and the same trend was indicated.

The invention claimed is:

1. A pneumatic tire comprising:
   a sidewall portion comprising an outer surface provided with a plurality of protruding portions protruding outwardly in a tire axial direction and arranged in a tire circumferential direction;
   each of the protruding portions comprising a pair of side surfaces extending in a tire radial direction at both ends in a tire circumferential direction of each of the protruding portions and a top surface arranged outermost in the tire axial direction between the pair of the side surfaces;
   in at least one of the protruding portions, the top surface being provided with at least one groove,
   heights of inner ends of the protruding portions in the tire radial direction from a bead base line are each in a range of from 0.5 to 0.7 times the tire section height,
   each of the protruding portions includes a radially outer side surface connected with a radially outer edge of the top surface,
   an angle of the outer side surface with respect to the tire axial direction is in a range of from 5 to 30 degrees,
   the groove extends along the tire circumferential direction, and
   at least one end of the groove terminates within the top surface so as to have a closed terminating end.

2. The pneumatic tire according to claim 1, wherein the at least one groove extends along the tire circumferential direction.

3. The pneumatic tire according to claim 1, wherein the at least one groove is connected with at least one of the pair of side surfaces.

4. The pneumatic tire according to claim 1, wherein the at least one groove connects between the pair of side surfaces.

5. The pneumatic tire according to claim 1, wherein said at least one of the protruding portions is provided with a plurality of the grooves arranged in the tire radial direction.

6. The pneumatic tire according to claim 1, wherein a depth of the at least one groove is in a range of from 40% to 70% of a protruding height of the at least one of the protruding portions.

7. The pneumatic tire according to claim 1, wherein a width of the at least one groove is in a range of from 10% to 25% of a length in the tire radial direction of the at least one of the protruding portions.

8. The pneumatic tire according to claim 1, wherein the at least one groove comprises a groove bottom including at least one arc-shaped portion convex inwardly in the tire axial direction in a cross section.

9. The pneumatic tire according to claim 1, wherein
   in at least one of the protruding portions, the top surface is provided with at least two grooves, and
   an arrangement pitch of the at least two grooves in the tire radial direction is in a range of from 150% to 350% of widths of the at least two grooves.

10. The pneumatic tire according to claim 1, wherein
    in the at least one of the protruding portions, the top surface is provided with a plurality of the grooves arranged in the tire radial direction, and
    a depth of the groove on the outer side in the tire radial direction is smaller than a depth of the groove on the inner side in the tire radial direction.

11. The pneumatic tire according to claim 1, wherein
    in the at least one of the protruding portions, the top surface is provided with a plurality of the grooves arranged in the tire radial direction, and
    a depth of the groove on the outer side in the tire radial direction is in a range of from 70% to 90% of a depth of the groove on the inner side in the tire radial direction.

12. The pneumatic tire according to claim 1, wherein
    in the at least one of the protruding portions, the top surface is provided with a plurality of the grooves arranged in the tire radial direction, and
    a radial width of the groove disposed on the outer side in the tire radial direction is smaller than a radial width of the groove disposed on the inner side in the tire radial direction.

13. The pneumatic tire according to claim 1, wherein
    in the at least one of the protruding portions, the top surface is provided with a plurality of the grooves arranged in the tire radial direction, and
    a width of the groove on the radially outer side is in a range of from 70% to 90% of a width of the groove on the radially inner side.

14. The pneumatic tire according to claim 1, wherein a length in the tire circumferential direction of each of the protruding portions is in a range of from 30 to 60 mm.

15. The pneumatic tire according to claim 2, wherein
    each of the protruding portions further includes a radially inner side surface connected with a radially inner edge of the top surface, and
    the groove is connected with one of the side surfaces, extends toward the other one of the side surfaces, and terminates within the top surface to have a closed terminating end without being connected with any other side surfaces than the one of the side surfaces.

16. The pneumatic tire according to claim 2, wherein
    each of the protruding portions further includes a radially inner side surface connected with a radially inner edge of the top surface, and
    the groove extends in the tire circumferential direction and terminates at both ends thereof within the top surface to have closed terminating ends without being connected with any side surfaces of the protruding portion.

17. The pneumatic tire according to claim 8, wherein a cross sectional profile of the groove includes two arc-shaped portions disposed at both ends in the tire radial direction of the groove bottom and a pair of groove side surfaces extending in a direction of a normal line.

18. The pneumatic tire according to claim 8, wherein a radius of curvature of the arc-shaped portion is not less than 1 mm and not greater than 3 mm.

19. The pneumatic tire according to claim 1, wherein the groove is connected with one of the side surfaces, extends toward the other one of the side surfaces, and terminates within the top surface so as to have a closed terminating end.

20. The pneumatic tire according to claim 1, wherein the groove terminates at both ends thereof within the top surface so as to have closed terminating ends.

* * * * *